United States Patent [19]

Evers

[11] 3,844,570

[45] Oct. 29, 1974

[54] RECORD PLAYER

[75] Inventor: Michael Evers, Emmasingel, Eindhoven, Netherlands

[73] Assignee: U.S. Phillips Corporation, New York, N.Y.

[22] Filed: June 21, 1973

[21] Appl. No.: 372,280

[30] Foreign Application Priority Data

July 1, 1972 Netherlands ........................ 729295

[52] U.S. Cl. .............................. 274/1 R, 274/39 R

[51] Int. Cl. .......................................... G11b 17/00

[58] Field of Search........ 274/39 R, 1 R, 9 A, 39 A, 274/9 R

[56] References Cited

UNITED STATES PATENTS

| | | | |
|---|---|---|---|
| 1,915,906 | 6/1933 | Thomas | 274/1 R |
| 2,106,718 | 2/1938 | Carson et al. | 274/9 A |
| 2,632,650 | 3/1953 | Offutt | 274/1 R |
| 3,425,703 | 2/1969 | Nanz et al. | 274/39 R |

*Primary Examiner*—Harry N. Haroian
*Assistant Examiner*—John W. Shepperd
*Attorney, Agent, or Firm*—Frank R. Trifari

[57] ABSTRACT

A record player having an automatic starting device which is actuated by placing a record on the turntable. This starting device comprises a contact ring, which is located underneath the turntable and provided with two circular electrically conducting contact tracks being included in the drive motor circuit and a cooperating contact element in the form of a leaf spring which is attached to the underside of the turntable and on which a sensor pin is arranged which protrudes through the turntable and can be actuated by a record being placed on the turntable.

2 Claims, 3 Drawing Figures

RECORD PLAYER

Figure 1:
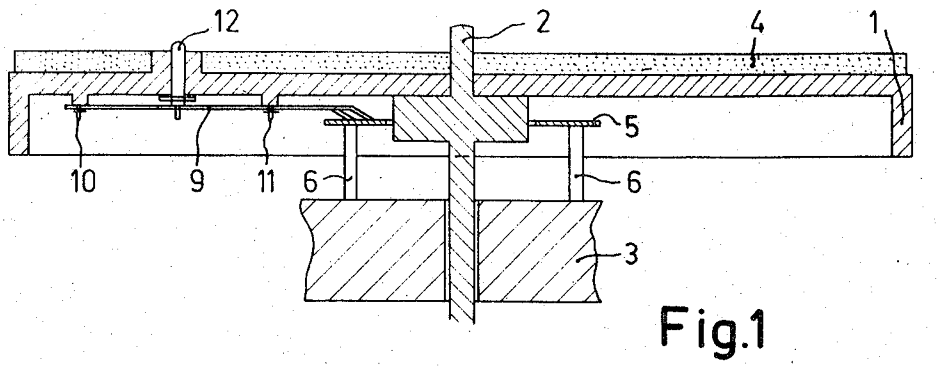

The invention relates to a record-player comprising a turntable, a drive motor for driving the turntable, a switch which is included in the motor circuit, is located underneath the turntable and has two associated contact elements, a sensor pin which projects through the turntable and from a position in which it protrudes from the turntable can be depressed against the force of a spring by placing a gramophone record on the turntable, thus operating a contact element of the switch.

A record-player of this type is known from British Patent Specification 616,469. In this known record-player the shouldered sensor pin centrally extends through the hollow turntable shaft, two resilient contact elements being accommodated in a housing which is secured to the underside of the bearing block of the turntable. When a gramophone record is placed on the turntable, it bears on the shoulder of the pin, so that the pin is pressed down, the contact elements are brought into engagement and the motor for driving the turntable is started. This known automatic starting device has the drawback of a considerable mounting height, whilst moreover during playing, a relative movement occurs between the stationary, shouldered sensor pin and the rotating gramophone record, which is not desirable.

It is an object of the invention to provide an improved record-player which comprises an automatic starting device of relatively small mounting height, without the occurrence of a relative movement between the pin and the record.

According to the invention, a record-player of the type mentioned in the preamble is characterized in that one of the contact elements is constituted by a ring-shaped plate which is arranged concentrically about the turntable shaft and is provided with two circular, electrically conducting contact tracks which are insulated from each other and are included in the motor circuit, the other, associated contact element being a leaf spring which is attached to the underside of the turntable, on which the sensor pin is arranged eccentrically relative to the turntable shaft.

In a preferred embodiment of the invention the leaf spring is secured to the turntable near one of its ends and at a point located between the ends, and the sensor pin is mounted on the leaf spring between the two points of attachment, and the ring-shaped contact plate is located opposite to the surface of the movable leaf-spring end which faces away from the turntable, said leaf-spring end resting against the two contact tracks of the contact plate in the non-depressed position of the sensor pin, but being lifted clear thereof when the sensor pin is depressed. In this way, it is ensured that during playing there is no mechanical contact between the leaf spring which rotates along with the turntable and the stationary contact plate.

An embodiment of the invention is described in more detail, by way of example, with reference to the drawing.

Figure 2:
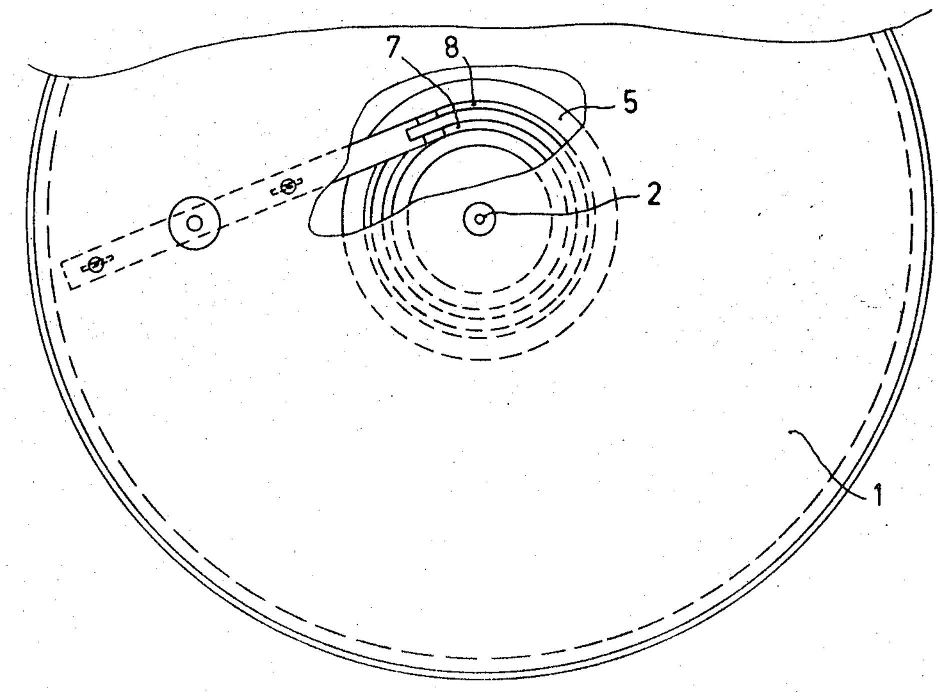
Figure 3:
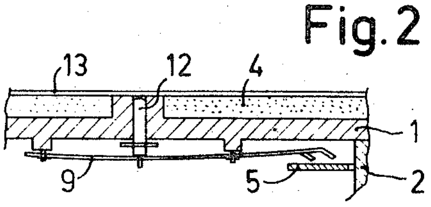

FIG. 1 is a sectional view of a turntable of a record player provided with an automatic starting device according to the invention, FIG. 2 is a top plan view of the turntable of FIG. 1, the turntable being partially cut away at its centre so that the switching device is visible, and FIG. 3 is a sectional view of a part of the turntable of FIG. 1 with a gramophone record placed on it.

As the drawing shows, a record-player according to the invention comprises a turntable 1, which is mounted on a shaft 2 which is supported on a bearing block 3 and can be driven by a motor, not shown. A conventional rubber or plastic mat 4 is placed on the turntable.

A ring-shaped contact plate is arranged concentrically about the turntable shaft and is rigidly secured to the bearing block 3 by supporting members 6. The surface of the plate 5 which faces the turntable is provided with two electrically conducting contact tracks 7, 8 which are insulated from each other and which are included in the circuit of the drive motor.

The contact tracks 7, 8 cooperate with a freely movable end of a leaf spring 9, which is secured to the turntable near its other end 10 and at a point 11 located between two ends. Between these two points of attachment 10, 11, there is mounted on the leaf spring a sensor pin 12 which projects through the turntable and which is depressed from a position in which it protrudes from the turntable (FIG. 1) by a gramophone record 13 (FIG. 3) placed on said turntable.

As is evident from FIGS. 1 and 2 in the non-depressed position of the sensor pin 12, the movable end of the leaf spring 9 is in engagement with the two contact tracks 7, 8 of the plate 5, which are consequently short-circuited in this position. In the depressed position of the pin, this leaf-spring end is lifted clear of the contact tracks 7, 8, as will be seen from FIG. 3. The electric circuit arrangement of the record-player is of such a design that when a gramophone record is placed on the turntable the electrical contact between the tracks 7, 8 is interrupted so that the turntable automatically starts to rotate, if required, after a certain delay time.

The radial distance between the turntable shaft 2 and the sensor pin 12 is selected so that the pin 12 can be operated by gramophone records of any standard diameter. In this respect, it is to be noted that the drawing does not show the exact proportions of, for example, this radial distance and the turntable diameter, but is to be considered merely as an illustration of this invention.

What is claimed is:

1. In a record player comprising a drive shaft, a turntable carried on the drive shaft, a drive motor for driving the turntable, a motor circuit for controlling operation thereof, a switch in said motor circuit having contact elements located underneath said turntable, a depressable sensor pin projecting through said turntable for operating said switch when a gramophone record is placed on said turntable, spring means engaging and biasing said sensor pin against depression, a ring shaped plate concentrically arranged about said drive shaft forming one of said contact elements, two electrically conducting contact tracks provided on said plate and included in said motor circuit, means insulating said tracks from each other, where in said spring means comprises and a leaf spring attached to the underside of said turntable and forming the other contact element of said switch.

2. In the record player according to claim 1 further comprising first means at one end of said leaf spring for attaching said leaf spring to said turntable, second means located at a point between the ends of said spring for attaching said spring to said turntable, a free movable end of said leaf spring having a surface facing away from said turntable and being located opposite said ring shaped plate, said movable end of said leaf spring being in engagement with said two contact tracks when said sensor pin is in the non-depressed position and being in non-engagement with said contact tracks when said sensor pin is depressed.

* * * * *

PO-1050
(5/69)

UNITED STATES PATENT OFFICE
CERTIFICATE OF CORRECTION

Patent No. 3844570 Dated October 29, 1974

Inventor(s) MICHAEL EVERS

It is certified that error appears in the above-identified patent and that said Letters Patent are hereby corrected as shown below:

In the heading:

"U.S. Phillips" should be --U.S. Philips--

Priority No. "729295" should be --7209295--

Claim 1, line 8, after "turntable," insert --and--

14, change "where in" to --wherein--

15, after "comprises" delete "and"

Signed and sealed this 4th day of February 1975.

(SEAL)
Attest:

McCOY M. GIBSON JR.
Attesting Officer

C. MARSHALL DANN
Commissioner of Patents